G. S. SWAN.
COMBINED CARD GAME AND EDUCATIONAL APPARATUS.
APPLICATION FILED AUG. 12, 1920.
1,392,977. Patented Oct. 11, 1921.
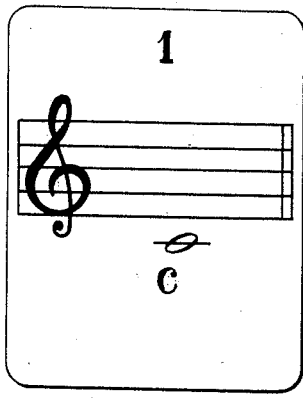
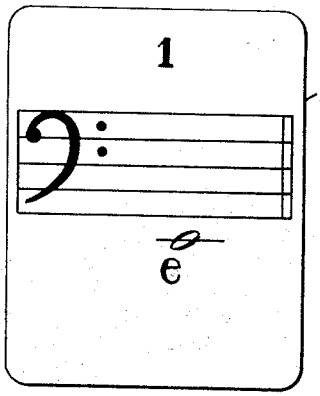
Fig. 1
Fig. 2
Fig. 3
WITNESSES:
INVENTOR.
BY Gertrude S. Swan
William M. Swan
ATTORNEY.

UNITED STATES PATENT OFFICE.

GERTRUDE S. SWAN, OF DETROIT, MICHIGAN.

COMBINED CARD GAME AND EDUCATIONAL APPARATUS.

1,392,977. Specification of Letters Patent. Patented Oct. 11, 1921.

Application filed August 12, 1920. Serial No. 402,943.

*To all whom it may concern:*

Be it known that I, GERTRUDE S. SWAN, a citizen of the United States, residing at Detroit, county of Wayne, State of Michigan, have invented a certain new and useful Improvement in Combined Card Games and Educational Apparatus, and declare the following to be a full, clear, and exact description of the same, such as will enable others skilled in the art to which it pertains to make and use the same, reference being had to the accompanying drawings, which form a part of this specification.

This invention relates to a combined card game and educational apparatus, and has for its object the combination upon a series or set of cards of symbols and markings by means of which a game may be arranged and played entertainingly, and at the same time the several markings for musical notes and the sequence thereof, ordinarily a laborious and monotonous task for a beginner in music, may be impressed upon the minds of the players as an incident of the game and of its rules.

In the drawings:

Figure 1 is an approximately full sized representation of the face of the first cards of the treble and bass series.

Fig. 2 is a diagrammatic representation of at least one card of each of the four series, showing how the game is started, certain of the rows showing more than one of the cards in place.

Fig. 3 is a diagrammatic representation of all of the cards composing the game series when they have been laid down in the proper sequence.

There being seven notes, $a, b, c, d, e, f, g$, in an "octave" of the musical scale, and it being desirable, not only to teach the beginning student the sequence of these notes, but also the fact that when one octave is completed, the next higher note is a repetition, as regards its letter name, of the first note of the octave below, each of the four series, J, K, L and M is preferably made to consist of at least eight units, and in fact, for purposes of illustration herein, I have shown and shall explain the same as consisting of thirteen units each, making a total of fifty-two cards constituting the game set. For variety, half of these cards may be black and the other half in a variant color, as red, and the red and black series are further differentiated by the fact that one half of them are printed with representations of the treble clef thereon and the other half with representations of the bass clef. The cards of each of these four series thus constituted, are numbered consecutively from one to thirteen, number one of the treble clef, for instance, having the musical representation of lower $c$, number two the musical representation of the next higher note lower $d$, number three the musical representation for lower $e$, etc. Similarly in the bass clef, card number one, which so far as the musical representation of the note itself is concerned, is the same for the note $e$ as is the symbol, in the treble clef, for the note $c$, is distinguished therefrom by the fact that the bar of music represented on the card bears the bass clef symbol, thereby impressing upon the mind of the user of the cards, even in a game sense, the distinctions between, and significance of, these symbols.

The game may be played according to a considerable variety of rules as regards the handling of the cards; all may be dealt out to the players, who are required to play in turn such cards as each one has in sequence as compared with those already laid down; or only a limited number of cards may be dealt out in the first place, and the rest kept faced downward in a common drawing stack from which the players draw in turn. No card can be played, as for example two in the treble clef, black series, which represents note $d$, until number one of that clef and color series has been played, and the object of the game is to get rid of all of one's cards as soon as possible, those having cards remaining in their hands when one of the players has put down all his cards being penalized the total of the number of the cards remaining in their respective hands. While studying his cards and determining what preceding cards are necessary for himself to draw, or for others to play, before, under the rules, he can play the cards already in his owne hand, the player is gradually but irresistably brought to study the sequence of the notes and the distinctions between the way they are represented in the treble clef and in the bass clef, and almost before he knows it, he has the scale well memorized. The game thus combines interesting and instructional features in a simple and compact way.

Of course, as hinted above, this game may be organized and played with fewer or more cards in each series than the thirteen that I have herein illustrated, the central object of the scheme being the impression upon the mind of the student player of the sequence of the musical notes. It would therefore be inadvisable to attempt to play with less than eight cards to a series, that is, one more than the seven notes of an octave, making a total of thirty-two in the pack; on the other hand, if it is desired that the representation of the musical notes shall exceed two complete octaves, at least fifteen cards to a series or sixty cards in the whole pack would be required. And it is of course obvious that the several series may be begun and ended with any chosen note, and may be represented in any desired key.

What I claim is:

1. An educational game, comprising a plurality of cards each bearing the mark of one of several diverse series, and each card being distinguished by a clef marking and the color thereof as belonging to one or another of the several series, and having associated with said markings a numerical symbol and a musical symbol which correspond in their pairings with the relative order numerically and on the musical scale denoted by that series with the numerical and musical symbols borne by the next adjacent cards of that series.

2. In an educational game, a plurality of cards, each of which bears one of several diverse series marks and in addition a clef marking in one or another of a plurality of selected colors and numerical and musical indicia calling for the arrangement of the individual cards in play in an order corresponding to the sequence of the several notes on the scale of the musical clef and in the color series to which the card belongs.

3. An educational game, comprising a plurality of series of cards, each of which bears on its face a clef designation printed in one or another of the several color series employed, a musical note symbol, and a numerical symbol whose arrangement in the regulated sequence of play results in the assembling of the cards so that their musical note symbols are arranged in the proper order for each clef and for each color series.

In testimony whereof I sign this specification in the presence of two witnesses.

GERTRUDE S. SWAN.

Witnesses:
Dyk Su Swan,
Jefferson G. Thurber.